United States Patent
Caruel

(10) Patent No.: US 10,087,842 B2
(45) Date of Patent: Oct. 2, 2018

(54) TURBOJET ENGINE NACELLE REINFORCING STRUCTURE

(71) Applicant: AIRCELLE, Gonfreville l'Orcher (FR)

(72) Inventor: Pierre Caruel, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 1179 days.

(21) Appl. No.: 13/894,647

(22) Filed: May 15, 2013

(65) Prior Publication Data
US 2013/0243589 A1   Sep. 19, 2013

Related U.S. Application Data

(63) Continuation of application No. PCT/FR2011/052564, filed on Nov. 3, 2011.

(30) Foreign Application Priority Data

Nov. 16, 2010   (FR) ..................... 10 59392

(51) Int. Cl.
| | |
|---|---|
| *F02C 7/20* | (2006.01) |
| *B64D 29/06* | (2006.01) |
| *B64D 33/04* | (2006.01) |
| *F01D 21/04* | (2006.01) |
| *F02K 1/76* | (2006.01) |

(52) U.S. Cl.
CPC ............... *F02C 7/20* (2013.01); *B64D 29/06* (2013.01); *B64D 33/04* (2013.01); *F01D 21/045* (2013.01); *F02K 1/766* (2013.01)

(58) Field of Classification Search
CPC ... F02K 1/766; F02K 1/72; F02K 1/64; F02K 1/70; F02K 3/04; F02K 3/06; F02K 1/763; B64D 29/06; B64D 33/04; F02C 7/20; F01D 21/045
See application file for complete search history.

(56) References Cited

U.S. PATENT DOCUMENTS 3,500,646 A *  3/1970  Hom ..................... F02K 1/72
                                                   239/265.29
4,145,877 A *  3/1979  Montgomery ......... F02K 1/72
                                                   60/226.2
(Continued)

FOREIGN PATENT DOCUMENTS

| EP | 0393259 A1 | 10/1990 |
| EP | 0875674 A1 | 11/1998 |

(Continued)

*Primary Examiner* — Ehud Gartenberg
*Assistant Examiner* — Jason H Duger
(74) *Attorney, Agent, or Firm* — Burris Law, PLLC

(57) ABSTRACT

A turbojet engine nacelle includes a fixed structure, which has a fan casing of the turbojet engine and a front frame mounted downstream of the fan casing and directly or indirectly supporting cascade vanes. The front frame is able to collaborate with a thrust reverser cowling sliding between a closed position covering the flow-diverting means and an open position exposing this flow-diverting means. At least one reinforcing structure of the engine nacelle transmits load between the fan casing and the front frame. The reinforcing structure extends along the longitudinal axis of the nacelle and supports a third line of defense and/or an inhibiting device between the front frame and the thrust reverser cowling.

14 Claims, 3 Drawing Sheets

(56) References Cited

U.S. PATENT DOCUMENTS

2008/0107538 A1\* 5/2008 Bois ........................ F01D 5/141
                                                                416/223 A
2010/0269511 A1\* 10/2010 Vauchel .................... B64C 7/02
                                                                  60/771

FOREIGN PATENT DOCUMENTS

| EP | 1488999 A1 | 12/2004 |
|----|------------|---------|
| FR | 2915527 A1 | 10/2008 |
| RU | 2 433 071 C2 | 11/2011 |
| RU | 2 509 649 C1 | 3/2014 |
| WO | 2008043903 A2 | 4/2008 |

\* cited by examiner

TURBOJET ENGINE NACELLE REINFORCING STRUCTURE

CROSS-REFERENCE TO RELATED APPLICATIONS

This application is a continuation of International Application No. PCT/FR2011/052564, filed on Nov. 3, 2011, which claims the benefit of FR 10/59392, filed on Nov. 16, 2010. The disclosures of the above applications are incorporated herein by reference.

FIELD

The present disclosure relates to a turbojet engine nacelle.

BACKGROUND

The statements in this section merely provide background information related to the present disclosure and may not constitute prior art.

Modern nacelles are designed to house a dual flow turbojet engine capable of using rotating fan blades to generate a hot air flow (primary flow) coming from the combustion chamber of the turbojet engine, as well as a set of related actuating devices connected to its operation and performing various functions when the turbojet engine is operating or stopped.

The nacelle generally has an outer structure, called Outer Fixed Structure (OFS), which defines, with a concentric inner structure, called Inner Fixed Structure (IFS), a stream aiming to channel a cold air flow, called secondary flow, that circulates outside the turbojet engine.

The primary and secondary flows are discharged from the turbojet engine through the rear of the nacelle.

Furthermore, a nacelle generally has a tubular structure comprising an air intake upstream of the turbojet engine, a middle section designed to surround the fan of the turbojet engine, a downstream section integrating thrust reversal means and designed to surround the combustion chamber of the turbojet engine, and generally ends with a jet nozzle whereof the output is situated downstream of the turbojet engine.

The role of these thrust reverser means is, during landing of an airplane, to improve the braking capacity thereof by reorienting at least part of the thrust generated by the turbojet engine forward. During this phase, the reverser obstructs at least part of the stream of the cold flow and orients that flow toward the front of the nacelle, thereby generating a counter-thrust that is added to the braking of the wheels of the airplane.

One common thrust reverser structure comprises a cowling in which an opening is formed designed for the deviated flow which, in a direct thrust situation of the gases, is closed by a sliding cowl and which, in the thrust reversal situation, is freed by translating the sliding cowl in the downstream direction (in reference to the flow direction of the gases), using cylinders for moving the cowl mounted on a frame of the cowling upstream from the opening, called front frame.

Because the nacelle undergoes axial aerodynamic forces during flight tending to cause the structure to retract relative to the engine, this front frame is connected to the structure of the turbojet engine, and, more specifically, the fan casing by means of connecting flanges or connections of the blade/groove type, for example.

The sliding cowl can be formed by an outer assembly made in a single piece with no breaks in the lower portion thereof slidingly mounted on rails positioned on either side of the pylori of the aircraft between a direct jet position and a thrust reversal position.

Such a cowl is often designated using the term "O-duct," which refers to the shape of the shroud of such a cowl, as opposed to a "D-duct," which comprises two half-cowls each extending over a half-circumference of the nacelle.

It is of course crucial for a sliding movement of the cowl using a thrust reverser not to occur unexpectedly: such opening would in fact be critical during a flight phase.

For these reasons, safety bolts are provided at various locations of the thrust reverser to prevent unwanted opening of the cowl.

In a "D-duct" reverser, three safety bolts are traditionally provided for each half-cowl or for both half-cowls if they are mechanically connected to each other. Two primary bolts are typically positioned on the front frame to act directly on two actuating cylinders of each half-cowl.

However, these primary bolts may become inoperative following the rupture of a rotor or a blade of the turbojet engine, that rupture causing the projection of debris around the turbojet engine, said debris impacting the reverser and being able to deform the reverser and/or deteriorate the bolts.

To quite significantly reduce the risk of unexpected opening, a third bolt is then available that ensures that the reverser is kept closed following the loss of the other two lines of defense after the aforementioned ruptures, this third bolt being inserted between the so-called "six o'clock" lower beam (i.e., positioned in the lower portion of the nacelle and on which the two half-cowls are slidingly mounted) and the concerned half-cowl.

The remote location of the third bolt with respect to the other two primary bolts offers increased safety with respect to a "rotor burst" (explosion of a disc of the rotor of the turbojet engine) or a blade-out.

In such a case, only one or two bolts may potentially be destroyed by the same disc, but not all of them.

A force path is thus preserved between the reactor mast and the lower beam. If that lower beam is cut, a force path will remain connecting the reactor mast to the bolt owing to the presence of the inner structure, called IFS, which connects the upper and lower beams over the entire length thereof.

In the case of an O-duct reverser, a similar arrangement would be desirable despite the absence of the lower beam.

It is thus possible to consider positioning a third line of defense and/or an inhibiting device between the front frame and the sliding cowl.

However, these bolts are bulky and become difficult to position when the reverser is very thin, i.e., the distance between the inner cowling and the outer cowling is reduced.

Irrespective of the arrangement provided for these bolts, the risk of the reverser, and more particularly the interface of the front frame and the fan casing, deforming and deteriorating following a rotor disc explosion is not nonexistent, making the installation of a third line of defense between the front frame and the sliding cowl ineffective.

In fact, the burst of an engine disc results in the discharge of a disc third with energy considered to be infinite, intermediate fragments (smaller disc portions) with significant energy, and small fragments (generally turbine or compressor blade elements) with low energy.

Because the intermediate fragments can be discharged over the entire circumference of the cowl, there is a risk of the retaining device between the front frame and the fan casing not being sufficient to retain the thrust reverser cowl axially.

To resolve this problem, it is known to place the third line of defense, i.e., the third bolt, at the rear end of the rails supporting the cowl, inserted between said pylori and said cowl. For the same reasons, the mechanical inhibiting device of the thrust reverser is placed in the same area.

The presence of these locking means between the cowl and the pylori makes it possible to perform geographically independent locking of the interface between the front frame and the fan casing, thereby offering the desired degrees of reliability and safety.

However, this type of assembly causes access and visual verification difficulties, which is in particular problematic when using a mechanical inhibiting device of the thrust reverser positioned in that location.

SUMMARY

The present disclosure provides an improved assembly of the third line of defense and/or an inhibiting device between a pylori and a cowl.

One aspect of the present disclosure provides an installation of a third safety bolt in a reverser of the "O-duct" type, which procures the same degree of reliability and safety as that of a "D-duct" reverser with respect to a risk of untimely opening of the sliding cowl.

It is also advantageous to propose a nacelle comprising a reverser of the "O-duct" type in which a third safety and/or inhibiting bolt is placed in a conventional area.

The present disclosure, in another form, provides a nacelle comprising a third safety and/or inhibiting bolt that is not very bulky and is easily accessible for an operator.

In another form, the present disclosure proposes a nacelle in which accidental deformations of the reverser that may result from impacts related in particular to engine disc bursts are decreased.

It is also desirable to propose a nacelle in which the risks of axial loss of the front frame and the thrust reverser cowl, which may result from impacts in particular related to engine disc bursts, are significantly reduced.

To that end, the present disclosure proposes a turbojet engine nacelle comprising a fixed structure comprising a fan casing of said turbojet engine and a front frame suitable for being mounted downstream of said fan casing and directly or indirectly supporting at least one flow deviating means, said front frame being capable of cooperating with a thrust reverser cowl sliding between a closed position covering the flow-deviating means and an open position exposing said flow-deviating means allowing a deviated flow, remarkable in that it also comprises at least one reinforcing structure designed to transmit forces between the fan casing and the front frame, said reinforcing structure extending along the longitudinal axis of the nacelle from the fan casing toward the front frame and being suitable to bear a third line of defense and/or an inhibiting device between the front frame and the thrust reverser cowl.

Owing to the present disclosure, secondary force passages are created between the fan cowl and the front frame that are suitable for being active in case of deterioration of the primary connection between the fan casing and the front frame, thereby making it possible to maintain the axial strength of the front frame and the reverser cowl with the fan casing.

According to specific forms, the assembly may comprise one or more of the following features, considered alone or according to all technically possible combinations:

- the reinforcing structure comprises a hollow box fastened on its length over the circumference of the front frame and suitable for being fastened at an upstream end to the fan casing;
- the nacelle comprises at least two reinforcing structures angularly spaced along the circumference of the front frame;
- the angular spacing between the two reinforcing structures is designed such that they are sufficiently separated from one another angularly so that only one is impacted by a disc third;
- the nacelle comprises two reinforcing structures positioned in a "six o'clock" area;
- each reinforcing structure is mounted between two adjacent deviating means;
- each reinforcing structure is mounted near actuators of the cowl;
- each reinforcing structure is suitable for each receiving an actuator of the cowl;
- the reinforcing structure is extended by a fastener suitable for fastening an inhibiting device of the reverser of the nacelle and/or a third line of defense;
- the nacelle also comprises a locking device for the force passage created between the fan casing and the front frame by the reinforcing structure;
- the locking device comprises a retaining member equipping the reinforcing structure designed to cooperate with a retaining member equipping the fan casing, the two retaining members being suitable for being locked by a complementary locking member secured to a fan cowl designed to receive the fan casing;
- the locking device extends in a radial plane of the fan casing;
- the retaining members are formed by radial fittings each comprising an opposite bore capable of receiving and retaining, when necessary, the locking member, said bores being adapted so that when the locking member passes through those bores, it hinders the movement of the front frame with sufficient play minimizing or preventing the passage of forces during normal operation;
- the locking member comprises a locking pin movable between a position in which it is separated from the retaining members and allows translation of the front frame, and a position in which it engages with the retaining members to prevent the front frame from sliding downstream of the nacelle;
- the control means of the locking device are connected to the opening or closing of the fan cowl.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
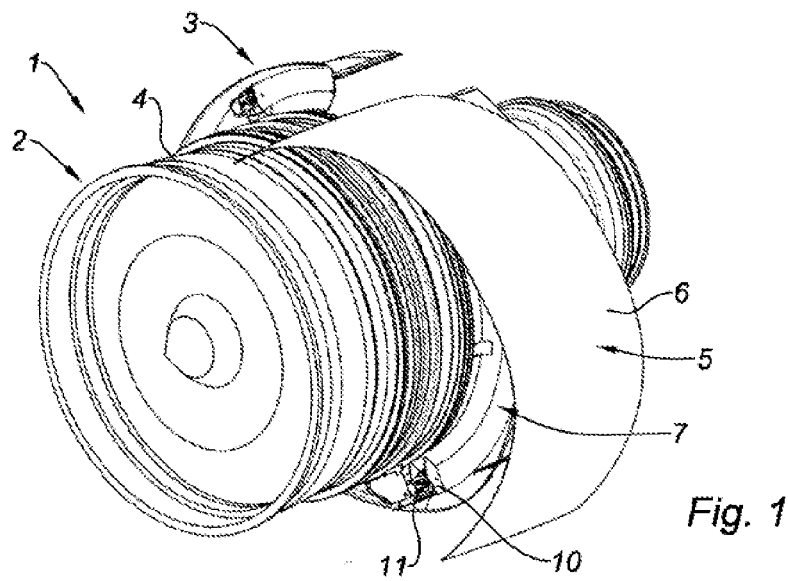
FIG. 1 is a partial perspective view of a nacelle whereof the reverser cowl has been laterally separated.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Traditionally, an aircraft propulsion assembly comprises a nacelle surrounding a turbojet engine, the general reference of which in FIG. 1 is 1, which both have a main longitudinal axis.

The nacelle 1 forms a tubular housing for the turbojet engine, for which it serves to channel the flows of air that it generates and is designed to be attached under a wing of the aircraft using a pylori (not shown in FIG. 1) oriented toward the front of the aircraft.

More specifically, the nacelle 1 has an outer structure comprising a front section forming an air intake, a middle section 2 surrounding a fan of the turbojet engine, and a rear section 3 surrounding the engine.

It also comprises an inner fairing structure of the engine which, with the outer structure, defines the stream designed for the circulation of a cold air flow in the case of a dual flow turbojet engine.

More specifically, the rear section 3 comprises an outer structure ensuring aerodynamic continuity with the middle section 2, which includes a fan casing 4 and houses the thrust reverser means 5.

The thrust reverser means 5 are of the so-called "cascade" type, which is well known.

They thus comprise a cowl 6 that is translatable, capable of alternating between a closed position, in which it covers the cascade vanes (not shown) and ensures the structural and aerodynamic continuity of the middle section 2, thereby allowing the discharge of the cold flow through that stream in the direct jet position, to a position open toward the downstream direction of the nacelle in which it exposes the cascade vanes, thereby opening a passage in the nacelle, and blocks, itself or by activating separate locking means, the stream downstream of the cascade vanes, thereby allowing reorientation of the cold flow in a so-called reversed jet.

The reverser cowl 6 ensures the aerodynamic continuity of a fan cowl (not shown) surrounding the fan casing 4.

The separate locking means may, for example, be downstream or upstream pivoting reverser flaps suitable for obstructing the cold flow stream.

The thrust reverser shown in FIG. 1 is of the O-duct type, i.e., the sliding thrust reverser cowl 6 forms an annular single-piece part extending without discontinuity from one side of the pylori to the opposite side of the pylori.

The reverser 5 also comprises guide means (not shown) of the cowl 6 that may be made up of rails sliding in parallel guideways, the guideways being parallel to the longitudinal axis of the nacelle 1 and attached to longitudinal so-called "12 o'clock" beams across from the pylori of the airplane or typically above the reverser, the rails themselves being attached to the thrust reverser cowl 6.

Furthermore, the cascade vanes are directly or indirectly supported by a front frame 7 closing the thickness of the nacelle 1 upstream of the cowl 6 and designed to be mechanically connected to the fan casing 4 by means of detachable connecting means.

This front frame is essentially in the form of a ring centered on the longitudinal axis of the nacelle 1 adapted to support the cascade vanes.

The detachable connecting means may be of any known type, such as a blade/groove fastening system, bolts, lock systems, etc. They form the first force passage path between the fan casing 4 and the front frame 7.

Furthermore, the reverser is traditionally activated by at least one actuator 10 of the cylinder type capable of translating the cowl 6 in the upstream or downstream direction of the nacelle 1 between its various positions, these driving cylinders of the cowl 6 traditionally being supported by radial fittings of the front frame 7.

Figure 3:
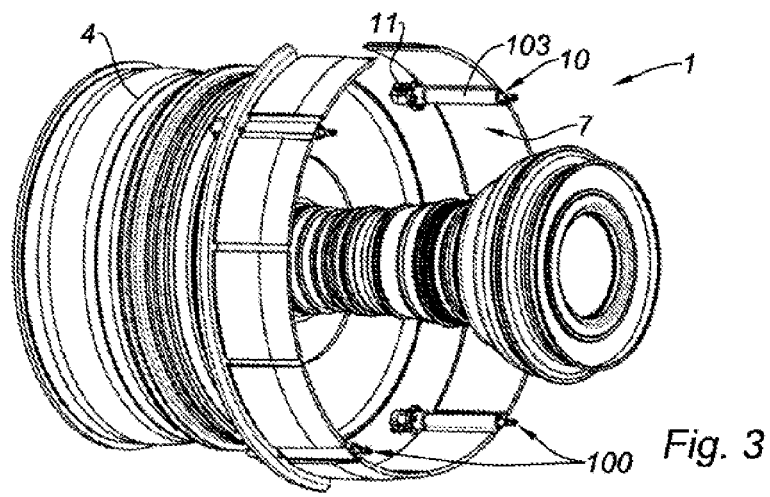
FIG. 3 illustrates the nacelle of FIG. 1 in perspective view, in which reinforcing structures are arranged according to another form of the present disclosure.

In the case at hand, in particular in FIG. 3, there are four actuating cylinders 10, i.e., two situated near the pylori on either side thereof and two in the area situated opposite it, but their arrangement will of course be adapted to the thrust reverser device used.

As shown in particular in FIGS. 1 and 3, the cylinders 10 are also connected to an electrical driving system 11 of a type that is known in itself.

The driving system may, for example, be made up of an electric motor and its electronic power system.

Of course, the disclosure also applies to thrust reversers actuated by hydraulic or pneumatic power.

Furthermore, the reverser is equipped with several primary bolts (not shown), known by those skilled in the art and designed to keep the cowl 6 in the closed position and traditionally attached to the front frame 4. These primary bolts may also be integrated into the actuating means.

These primary bolts become ineffective in case of deformation of the front frame 7 following an impact or the rupture of an actuating means if any are integrated therein, and the reverser also comprises at least one tertiary bolt attached at a different location from the primary bolts, the function of said tertiary bolt being to avoid any untimely movement of the cowl 6 following a failure of the primary bolts.

Furthermore, during maintenance operations on the turbojet engine or the nacelle 1 surrounding it, it is important to ensure that the cowl 6 cannot open unexpectedly, which would present a danger for operators.

Likewise, if the primary bolts and tertiary bolt are damaged, it may be necessary to inhibit the moving cowl mechanically rather than risking deployment during flight.

The reverser may then comprise at least one electrical and/or mechanical inhibiting device to inhibit the cowl 6 during these operations.

The aforementioned tertiary bolts and/or inhibiting devices will be placed on the circumference of the ring of the front frame 7 in the lower portion, in particular in the six o'clock area, despite the absence of a lower beam, as will be described more specifically in reference to FIGS. 2 to 9.

Figure 2:
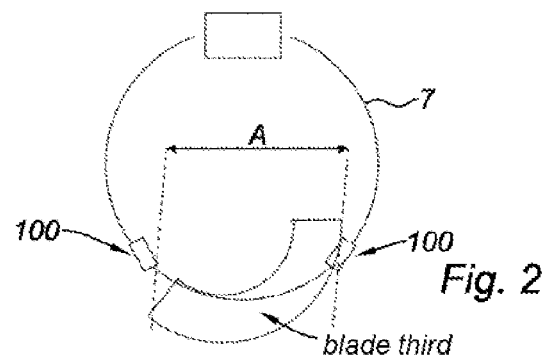
FIG. 2 is a diagrammatic cross-sectional view of an arrangement of reinforcing structures on a thrust reverser of the nacelle of FIG. 1.

According to the present disclosure, in reference to FIGS. 2 and 3, the nacelle 1 comprises at least one reinforcing structure 100 designed to transmit forces between the fan casing 4 and the front frame 7, said reinforcing structure 100 extending along the longitudinal axis of the nacelle 1 from the fan casing 4 toward the front frame 7, this reinforcing structure being suitable for supporting a third line of defense and/or an inhibiting device between the front frame 7 and the thrust reverser cowl 6.

Advantageously, an additional force passage is thus created between the fan casing 4 and the ring of the front frame 7 supporting the cascade vanes, that passage being adapted to be active in the event an engine disc bursts or in case of any other impact that may deteriorate the thrust reverser and the retention of the front frame 7 supporting the vanes and the thrust reverser cowl 6 relative to the fan casing 4.

In a first form illustrated in FIG. 2, at least two reinforcing structures 100 are formed between the fan casing 4 and the front frame 7 and angularly spaced along the circumference of the ring of the front frame 7, so as to create at least two independent force passages between the fan casing 4 and the front frame 7.

The angular spacing A between the two illustrated reinforcing structures 100 is designed such that they are angularly separated from each other enough that only one can be impacted by a disc third.

Figure 4:
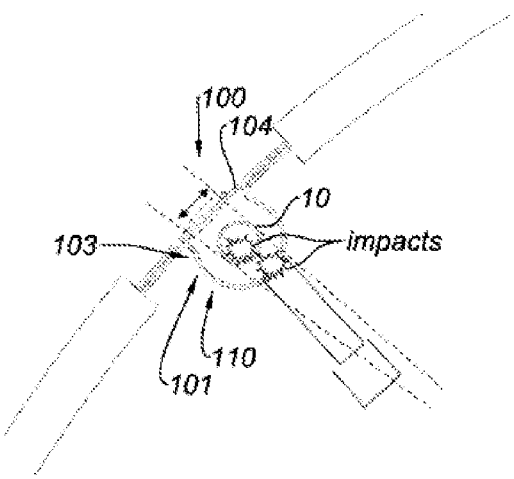
FIGS. 4 and 5 are cross-sectional and lateral perspective views, respectively, of the reinforcing structure according to one alternative form of the present disclosure.
Figure 5:
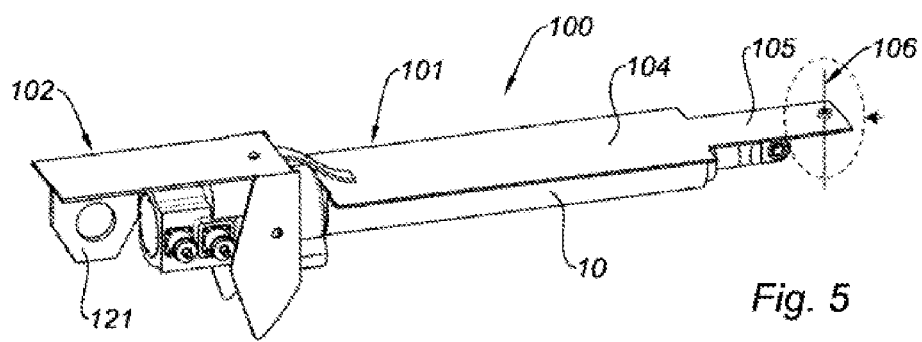

In reference to FIGS. 3 to 5, in one form, each reinforcing structure 100 comprises a hollow box 110 fastened on its length over the circumference of the ring of the front frame 7 and suitable for being fastened at an upstream end to the fan casing 4.

It more precisely comprises a first portion 101 forming a box suitable for supporting the bolt and/or an inhibiting device and a second portion 102 suitable for forming part of a locking device between the casing 4 and the front frame 7 activating the force passage created by the reinforcing structure 100.

The first portion 101 has a hollow box structure in the shape of a backwards D extending longitudinally along the longitudinal axis of the nacelle 1 and also extending in a corresponding radial plane.

It thus comprises an open hollow cylindrical profile 103 whereof the concavity is oriented toward the inner circumference of the ring 7 of the front frame.

In one non-limiting example, this profile 103 is placed between two adjacent vanes.

It is thus attached by suitable branches on the ring 7 supporting the cascade vanes.

The first portion 101 also comprises a longitudinal plate 104 extending at least over the entire length of the ring 7 and suitable for covering the profile 103, thereby forming a box 110 whereof both ends are open.

This plate 104 is also attached by suitable branches on the ring supporting the cascade vanes, as illustrated in FIG. 4.

It should be noted that the profile 103 and plate 104 may or may not be formed in a single piece.

Furthermore, they may be made from metal.

In one form, each reinforcing structure 100 is mounted near actuating cylinders 10 of the thrust reverser cowl 6.

In one alternative form, each reinforcing structure 100 is suitable for each receiving and housing an actuating cylinder 10 of the cowl 6.

This offers the advantage of involving the cylinders 10 in protecting the force passages created by the presence of the reinforcing structures 100.

In fact, by nature, the cylinders 10 and the profile 103 of the reinforcing structure 100 are strong parts adapted to absorb a significant portion of the energy following the impact of a fragment, allowing the plate 104 to be partially protected from any impact and making it possible to ensure the force passage between the fan casing 4 and the front frame 7, as illustrated in FIG. 4.

Housing the cylinders 10 in the reinforcing structures 100 also offers the advantage of reducing the thicknesses of the parts of the reinforcing structure 100 inasmuch as each cylinder 10 participates in absorbing the energy from the impacts of the latter, as seen above.

As illustrated in FIG. 3, in one non-limiting example, the nacelle 1 is thus equipped with four reinforcing structures 100 housing four actuating cylinders 10, i.e., two in the upper portion of the nacelle and two in the lower portion in a six o'clock area, thereby offering four independent force passages on the circumference of the ring 7 of the front frame supporting the cascade vanes, between the fan casing 4 and the front frame 7.

Furthermore, such a reinforcing structure 100 offers the advantage of being strong while meeting the requirements of having a reduced bulk and mass.

Each reinforcing structure 100 extends, due to its shape, angularly over a small space so as to be able to produce an area withstanding any impact without creating a significant excess weight of the reverser.

Furthermore, as more particularly illustrated in FIG. 5, at the end thereof corresponding to the free periphery of the ring 7 of the front frame, the plate 104 is extended by a fastener 105 suitable for attaching an inhibiting device or a third bolt.

In this fastener 105, a through orifice 106 is formed that is suitable for receiving fastening means designed to cooperate with the inhibiting device or a provided third bolt.

Thus, as illustrated in FIG. 3 in a non-limiting example, four force paths as well as four tertiary bolts and/or inhibiting devices are distributed on the circumference of the ring 7, including two in the six o'clock area, despite the absence of a lower beam.

Advantageously, it is thus possible to place the third line of defense and/or an inhibiting device of the reverser between the ring of the front frame 7 and the cowl of an O-duct reverser, in an angular position where they are easily accessible.

Furthermore, in reference to FIGS. 6 to 9, each reinforcing structure 100 is extended beyond the profile 103, upstream of the front frame 7, to form part of the locking device 120 of the force passage created between the fan casing 4 and the front frame 7.

Figure 7:
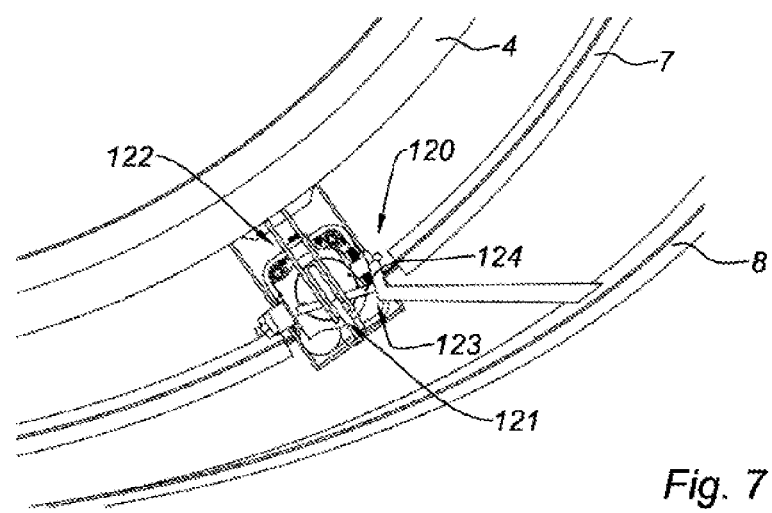
Figure 8:
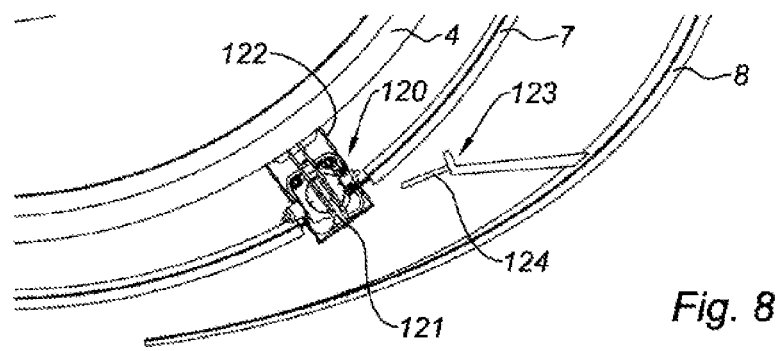

In one alternative form, this device 120 comprises a retaining member 121 equipping the reinforcing structure 100 designed to cooperate with a retaining member 122 equipping the fan casing 4, the two retaining members 121, 122 being suitable for being locked by a complementary locking member 123 secured to the fan cowl 8 (shown in FIGS. 7 and 8).

This locking device 120 extends in a radial plane of the fan casing 4, from the fan casing 4 toward the fan cowl 8, covering it.

According to one form of the disclosure, the retaining members 121, 122 may be formed by radial fittings provided to that end.

Thus, more specifically, the fan casing 4 has, on its outer circumference, a U-shaped fitting 122 extending radially toward the ring 7 supporting the cascade vanes.

This fitting 122 comprises two parallel wings that define an open space in which a radial fitting 121 will be inserted formed on the reinforcing structure 100.

The fitting 121 of the reinforcing structure 100 is supported by the second portion of the structure 100 and, more specifically, by the interface of the plate 104 extended upstream of the front frame 7, at its free end, as illustrated in FIG. 5.

The two fittings 121, 122 are suitable for cooperating with each other and with the locking member 123 secured to the fan cowl 4.

They thus each comprise opposite bores capable of receiving and retaining the locking member 123 when necessary, said bores being adapted so that when the locking member 123 passes through said bores, it hinders the movement of the front frame 7 and the corresponding ring.

It should be noted that these fittings 121, 122 and the second portion 102 of the reinforcing structure 100 are protected from impacts, in particular related to an engine disc burst or any other impact by the fan casing 4 itself.

In one alternative form, the complementary locking member 123 comprises a locking pin 124 that can be moved between a position in which it is separated from the retaining members 121, 122 and allows translation of the front frame 7—moving cowl 6 assembly in a maintenance position of the outer structure, and a position in which it engages with the retaining members 121, 122 to prevent the sliding of the front frame 7—moving cowl 6 assembly downstream of the nacelle 1.

This pin 124 is mounted on the inner circumference of the fan cowl 8 in a plane perpendicular to the movement of the front frame—cowl assembly in a non-radial direction, allowing it to pass through the open space between the two rings of the fitting 122 of the fan casing 4.

Advantageously, this locking device 120 is independent of the primary locking device placed at the interface between the ring 7 of the front frame and the fan casing 4.

This offers the advantage of maintaining the force passage created by each reinforcing structure 100 in case of failure of that interface (failure not necessarily related to a rotor burst of the engine).

To that end, the control means of the locking device 120 are connected to the opening or closing of the fan cowl 8.

Figure 9:
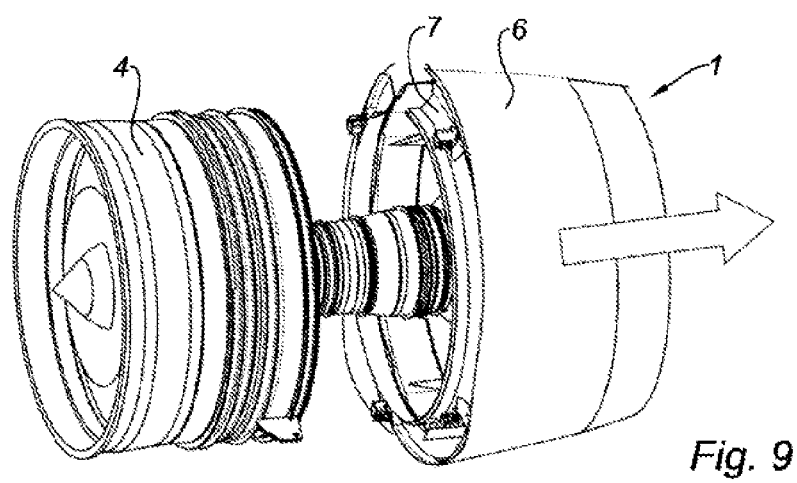
FIG. 9 illustrates a perspective view of the nacelle of FIG. 1, whereof the thrust reverser is in an active position in which the reverser cowl has been translated in its open position toward the downstream direction of the nacelle.

As illustrated in FIG. 8, the opening of the fan cowl 8 releases the blocking pin 124 from the bores of the corresponding fittings 121, 122 and thereby allows translation of the front frame 7—cowl 6 assembly in the downstream direction of the nacelle 1 into the maintenance position, illustrated in FIG. 9, to allow access to the engine.

Figure 6:
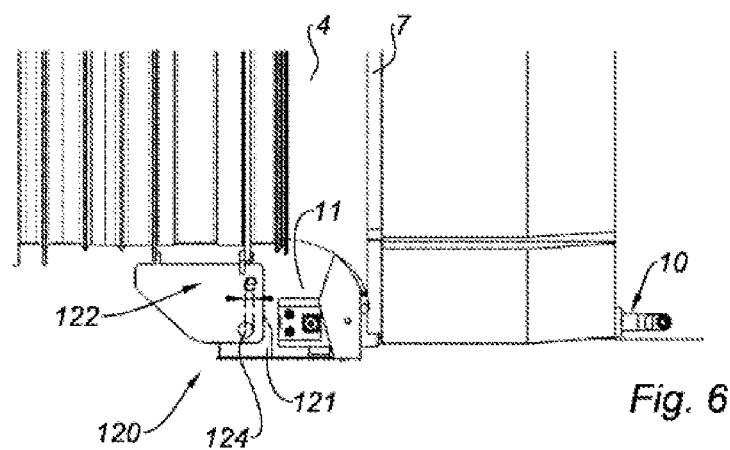
FIGS. 6 to 8 are longitudinal cross-sectional and transverse views, respectively, of a locking device between a fan cowl and a front frame of the nacelle FIG. 1, said device being in the locked position in FIGS. 6 and 7 and in the unlocked position in FIG. 8.

Furthermore, in reference to FIG. 6, the locking device 120 may comprise axial play between its various component parts, such that the additional force passage created by each reinforcing structure 100 is only active when the primary force passage between the fan casing 4 and the front frame 7 is lost or deteriorated by an impact.

Thus, play "e" is defined between the outer circumference of the pin 124 passing through the bores of the fittings 121, 122 and the inner circumference of the corresponding bore of the fitting 122 of the fan casing 4.

This play "e" is eliminated in the event of a loss of the primary force passage between the fan casing 4 and the front frame 7, following the burst of a disc or any other breakdown situation, causing the fan casing 4 and the front frame 7 to be locked by the locking pin 124.

Of course, the disclosure is not limited to the forms of the nacelle described above as examples, but on the contrary encompasses all possible alternatives.

What is claimed is:

1. A turbojet engine nacelle comprising:
a fixed structure comprising a fan casing of a turbojet engine and a front frame mounted downstream of the fan casing, the front frame defining a ring structure concentric with the fan casing and cooperating with a thrust reverser cowl sliding between a closed position and an open position; and
at least one reinforcing structure coupling the fan casing and the front frame and providing a force passage therebetween, said reinforcing structure extending along a longitudinal axis of the nacelle from the fan casing toward the front frame,
wherein the at least one reinforcing structure comprises a plate, an enclosure and a retainer fitting, wherein the retainer fitting is secured to the fan casing and the plate is fastened to the front frame thereby providing the force passage, wherein the enclosure and the plate form a hollow box structure extending within the front frame substantially parallel to the longitudinal axis and surrounding a longitudinal portion of a respective actuator of the thrust reverser cowl, and
wherein the plate further includes a through orifice extending radially relative to the longitudinal axis and configured to receive a safety bolt inhibiting movement of the thrust reverser cowl.

2. The nacelle according to claim 1, wherein the hollow box structure extends over a circumferential segment of the front frame.

3. The nacelle according to claim 1, wherein the at least one reinforcing structure includes two reinforcing structures separated from one another angularly by a distance larger than a third of an engine disc.

4. The nacelle according to claim 3, wherein the nacelle includes an upper power and a lower portion and the two reinforcing structures are positioned in the lower portion.

5. The nacelle according to claim 1, wherein the at least one reinforcing structure is mounted between two adjacent cascade vanes.

6. The nacelle according to claim 1, wherein the respective actuator of the thrust reverser cowl is configured to protect the force passage.

7. The nacelle according to claim 6, wherein the the enclosure and the respective actuator of the thrust reverser cowl are configured to act in conjunction to absorb impacts, in order to protect the force passage.

8. The nacelle according to claim 1, wherein the through orifice is located in an extension of the plate.

9. The nacelle according to claim 1, wherein it the retainer fitting is configured to facilitate locking of the force passage.

10. The nacelle according to claim 9, wherein the retainer fitting is secured to the fan casing by and configured to cooperate with a a retainer equipping the fan casing, the retainer fitting and the retainer equipping the fan casing being locked by a pin secured to a fan cowl designed to receive the fan casing, in order to facilitate the locking of the force passage.

11. The nacelle according to claim 9, wherein the retainer fitting extends in a radial plane of the fan casing.

12. The nacelle according to claim 10, wherein the retainer fitting and the retainer equipping the fan casing each comprise a bore capable of receiving and retaining the pin, the bore of the retainer fitting and the bore of the retainer equipping the fan casing hindering movement of the front frame by the pin.

13. The nacelle according to claim 10, wherein the pin is movable between a first position in which the pin is separated from the retainer fitting and the retainer equipping the fan casing and allows translation of the front frame, and a second position in which the pin engages with the retainer fitting and the retainer equipping the fan casing to prevent the front frame from sliding downstream of the nacelle.

14. The nacelle according to claim 10, wherein opening of the fan cowl releases the pin.

\* \* \* \* \*